US012786875B2

(12) United States Patent
Bhatoolaul et al.

(10) Patent No.: US 12,786,875 B2
(45) Date of Patent: Nov. 3, 2026

(54) TRANSMISSION INDICATION FOR MULTICAST SERVICE

(71) Applicant: Nokia Technologies Oy, Espoo (FI)

(72) Inventors: David Bhatoolaul, Swindon (GB); Ganesh Venkatraman, Oulu (FI); Subin Narayanan, Oulu (FI); Alok Sethi, Oulu (FI); Ugur Baran Elmali, Munich (DE)

(73) Assignee: Nokia Technologies Oy, Espoo (FI)

( * ) Notice: Subject to any disclaimer, the term of this patent is extended or adjusted under 35 U.S.C. 154(b) by 270 days.

(21) Appl. No.: 18/785,036

(22) Filed: Jul. 26, 2024

(65) Prior Publication Data

US 2025/0048263 A1 Feb. 6, 2025

Related U.S. Application Data

(60) Provisional application No. 63/516,610, filed on Jul. 31, 2023.

(51) Int. Cl.
*H04W 52/02* (2009.01)
*H04L 1/1812* (2023.01)

(52) U.S. Cl.
CPC ....... *H04W 52/0229* (2013.01); *H04L 1/1812* (2013.01); *H04W 52/0241* (2013.01)

(58) Field of Classification Search
CPC ......... H04W 52/0229; H04W 52/0241; H04W 52/0235; H04W 4/06; H04L 1/1812; H04L 1/18; Y02D 30/70
See application file for complete search history.

(56) References Cited

U.S. PATENT DOCUMENTS

2005/0195760 A1 9/2005 Lee et al.

FOREIGN PATENT DOCUMENTS

| | | | | | |
|---|---|---|---|---|---|
| WO | WO-2018204842 A2 | * | 11/2018 | | H04W 52/0229 |
| WO | 2023/108438 A1 | | 6/2023 | | |
| WO | 2024/213305 A1 | | 10/2024 | | |
| WO | WO-2024234123 A1 | * | 11/2024 | | H04W 72/23 |

OTHER PUBLICATIONS

"New SID: Study on low-power Wake-up Signal and Receiver for NR", 3GPP TSG RAN meeting #94e, RP-213645, vivo, Agenda Item: 8A.1, Dec. 6-17, 2021, 4 pages.
"Discussion on physical signal and procedure for low power WUS", 3GPP TSG RAN WG1 #113, R1-2304502, vivo, Agenda Item: 9.11.3, May 22-26, 2023, 39 pages.
"3rd Generation Partnership Project; Technical Specification Group Radio Access Network; NR; Radio Resource Control (RRC) protocol specification (Release 17)", 3GPP TS 38.331 V17.4.0, Mar. 2023, pp. 1-1324.
"IEEE 802.11", Wikipedia, Retrieved on Jul. 7, 2025, Webpage available at: https://en.wikipedia.org/wiki/IEEE_802.11.
Extended European Search Report received for corresponding European Patent Application No. 24185937.0, dated Dec. 19, 2024, 10 pages.

* cited by examiner

*Primary Examiner* — Cheikh T Ndiaye
(74) *Attorney, Agent, or Firm* — Barta Jones, PLLC

(57) ABSTRACT

Example embodiments of the present disclosure relate to methods, devices, apparatuses and computer readable storage medium for a transmission indication for a multicast service. In a method, a first apparatus receives a wakeup signal indicating that a next transmission for a multicast service is a new initial transmission or a retransmission. In response to receiving the wakeup signal, the first apparatus performs an action.

20 Claims, 5 Drawing Sheets

TRANSMISSION INDICATION FOR MULTICAST SERVICE

FIELDS

Various example embodiments of the present disclosure generally relate to the field of telecommunication and in particular, to methods, devices, apparatuses and computer readable storage medium for a transmission indication for a multicast service.

BACKGROUND

Connected Mode discontinuous reception (DRX) is a power-saving feature in Long Term Evolution (LTE) and fifth generation (5G) cellular networks. It allows devices to periodically disconnect from the network for short periods of time without interrupting ongoing data transmissions. Normally, a device is connected to the network in a connected mode, which can be a significant battery drain, especially for devices with small batteries, such as wearables and Internet of Things (IoT) devices. Connected Mode DRX (C-DRX or CDRX) allows devices or radios (or receivers) to disconnect from the network and enter a low power mode for short periods of time, such as 10 seconds or 20 seconds, without interrupting ongoing data transmissions. This can help to reduce battery drain.

Within the Release 18 3GPP Study Item on a low power wake up signal (LP-WUS), the use of an LP-WUS in a connected mode, in particular for battery intensive Extended Reality (XR) applications, has been discussed at a high level. It is considered how an LP-WUS in a connected mode could work with and without C-DRX based on the principle of using the LP-WUS to allow a main radio or receiver to power down to a lower power consumption state.

SUMMARY

In a first aspect of the present disclosure, there is provided a first apparatus. The first apparatus comprises at least one processor; and at least one memory storing instructions that, when executed by the at least one processor, cause the first apparatus at least to: receive a wakeup signal indicating that a next transmission for a multicast service is a new initial transmission or a retransmission; and in response to receiving the wakeup signal, perform an action.

In a second aspect of the present disclosure, there is provided a second apparatus. The second apparatus comprises at least one processor; and at least one memory storing instructions that, when executed by the at least one processor, cause the second apparatus at least to: determine that a next transmission for a multicast service is a new initial transmission or a retransmission; and transmit a wakeup signal indicating that the next transmission is the new initial transmission or the retransmission.

In a third aspect of the present disclosure, there is provided a method. The method comprises: receiving a wakeup signal indicating that a next transmission for a multicast service is a new initial transmission or a retransmission; and in response to receiving the wakeup signal, performing an action.

In a fourth aspect of the present disclosure, there is provided a method. The method comprises: determining that a next transmission for a multicast service is a new initial transmission or a retransmission; and transmitting a wakeup signal indicating that the next transmission is the new initial transmission or the retransmission.

In a fifth aspect of the present disclosure, there is provided a first apparatus. The first apparatus comprises means for receiving a wakeup signal indicating that a next transmission for a multicast service is a new initial transmission or a retransmission; and means for in response to receiving the wakeup signal, performing an action.

In a sixth aspect of the present disclosure, there is provided a second apparatus. The second apparatus comprises means for determining that a next transmission for a multicast service is a new initial transmission or a retransmission; and means for transmitting a wakeup signal indicating that the next transmission is the new initial transmission or the retransmission.

In a seventh aspect of the present disclosure, there is provided a computer readable medium. The computer readable medium comprises instructions stored thereon for causing an apparatus to perform at least the method according to the third or fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
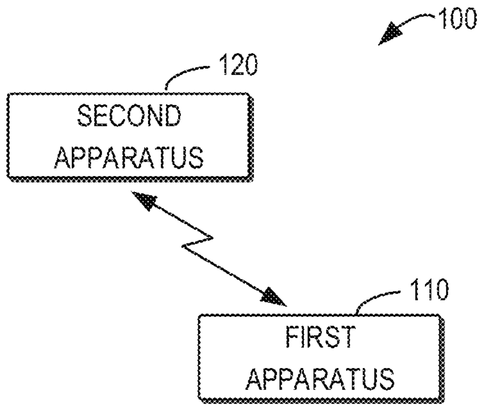
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a headmounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms “terminal device”, “communication device”, “terminal”, “user equipment” and “UE” may be used interchangeably.

As used herein, the term “resource,” “transmission resource,” “resource block,” “physical resource block” (PRB), “uplink resource,” or “downlink resource” may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

Connected Mode DRX (C-DRX or CDRX) is implemented by a device and a network. The device periodically wakes up to check for any pending data transmissions. If there are no pending data transmissions, the device goes back to sleep. If there are pending data transmissions, the device sends or receives the data transmissions and then goes back to sleep.

In a normal (or non-multicast-broadcast services (non-MBS)) connected DRX mode, the following timers are used. A DRX Inactivity Timer (DRX-InactivityTimerPTM, specified in the third-generation partnership project (3GPP) TS 38.331, and a default value is 10 seconds) is a key part of how 5G NR achieves power savings. The DRX Inactivity Timer (drx-InactivityTimer) is a timer that determines how long a device will stay in the active state after receiving a PDCCH message. If no new PDCCH messages are received during the timer period, the device will go into the DRX sleep state to conserve power. The drx-InactivityTimer is configured in milliseconds (ms) and the value can vary depending on the device and the network. For example, a device that is frequently receiving data may have a shorter drx-InactivityTimer than a device that only receives data occasionally. The drx-InactivityTimer is an important part of DRX, which is a power saving mechanism used by cellular devices. DRX allows devices to sleep for periods of time when they are not receiving data, which can significantly extend battery life. The drx-InactivityTimer is a valuable tool for conserving battery life in cellular devices. By carefully configuring the drx-Inactivity Timer, network operators can ensure that devices only stay in the active state when they need to be, which can lead to significant power savings.

A Hybrid Automatic Repeat Request (HARQ) Round Trip Time (RTT) Timer (HARQ-RetransmissionTimerPTM, specified in 3GPP TS 38.331, a default value is 200 ms) is used to ensure that data packets are reliably delivered. If a data packet is lost or corrupted, the device will wait for a retransmission of the packet. The HARQ RTT Timer determines how long the device will wait for a retransmission. A DRX Retransmission Timer (DRX-RetransmissionTimerPTM, specified in 3GPP TS 38.331, a default value is 20 seconds) is used to ensure that data packets are reliably delivered when the device is in a DRX state. If a data packet is lost or corrupted when the device is in a DRX state, the device will wake up and check for a retransmission of the packet. The DRX Retransmission Timer determines how long the device will wait for a retransmission.

As discussed above, for Release 18, it is concerned how an LP-WUS in a connected mode could work with and without C-DRX based on the principle of using the LP-WUS to allow a main radio or receiver to power down to a lower power consumption state. It is considered to rely on the LP-WUS to trigger PDCCH monitoring or rely on the LP-WUS to schedule physical downlink shared channel (PDSCH) (for example, skipping the DCI monitoring). The LP-WUS with the functionality of triggering user equipment (UE) to resume PDCCH monitoring can be considered to interact with the existing UE power saving techniques which are PDCCH monitoring adaptation, e.g., Release 15 or Release 16 (R15 or R16) CDRX, Release 17 (R17) PDCCH skipping and search space set group (SSSG) switching.

For XR use cases, considering LP-WUS in conjunction with CDRX configuration with long DRX on-duration to cover the jitter range, a potential method for exploiting LP-WUS for power saving, is to keep the main radio in a low power state during the DRX on-duration and rely on the LP-WUS receiver to wake the main radio when it detects a LP-WUS signal. Once the LP-WUS is detected, the UE LP-WUS receiver wakes the main radio and resumes PDCCH monitoring from micro or light sleep of a main ratio (MR). After the finishing of data transmission, the UE can enter sleep state by the expiry of a DRX inactivity timer or via R17 PDCCH skipping indication (if configured). Apart from applying an LP-WUS during DRX on-duration, the LP-WUS can also be configured to be monitored during the PDCCH skipping period. As such, the long scheduling latency caused by such as CDRX off can be reduced accordingly.

Without CDRX configuration, PDCCH monitoring adaptation can also be achieved by applying an LP-WUS and R17 PDCCH skipping simultaneously. This approach can provide an ideal trade-off between latency and power consumption. Moreover, an LP-WUS can also interact with R17 SSSG switching. For example, a UE can resume the PDCCH monitoring in a target SSSG after triggered by an LP-WUS. However, since the same functionality of an LP-WUS and a downlink control signal of power saving (DCP) without a dormancy indication, there seems no need to configure both of them. Actually, due to the lower monitoring power consumption, an LP-WUS can obtain better power saving effect than that of a DCP.

It is proposed that for a radio resource control (RRC) connected mode, a UE resumes PDCCH monitoring from lower power sleep state of an MR once LP-WUS is detected. It is also proposed for an RRC connected mode, an LP-WUS can be interacted with the existing UE power saving techniques including at least CDRX, R17 PDCCH skipping and R17 SSSG switching. Moreover, an LP-WUS style signal may be used to replace “activation” of a PDCCH for configured grant transmissions, thereby enabling the main radio to spend more time in a deep sleep low-power-consuming state.

For MBS operation, even if a UE has successfully received an initial transmission for a multicast service, the UE does not know whether the next multicast scheduling downlink control information (DCI) is either another new transmission or a retransmission on behalf of other UEs also using that service but which non-acknowledged (NACKed)

the first initial transmission. Until the main radio has decoded the 1-bit "New Data Field" sent in the DCI formats used by Multicast services (formats 4_1 and 4_1), the UE can know that the next multicast scheduling DCI is a new transmission. This means that the main radio must be fully ON to decode the DCI "new data field", even though that specific UE may NOT need a retransmission and that specific DCI may just be indicating a retransmission for other UEs.

Example embodiments of the present disclosure propose a transmission indication scheme. The scheme uses a wakeup signal (such as an LP-WUS) to indicate that a next transmission for a multicast service is a new initial transmission or a retransmission. This allows a device (such as a UE) to maintain in a lower power state for a longer period.

For example, by exploiting an LP-WUS to indicate the "new data indicator" ahead of DCI, a main radio of a UE may drop into a low power mode between potential PDCCH transmissions. The LP-WUS, which is sent prior to the next scheduling DCI, is relied on to determine whether to wake the main radio up for full DCI processing. This LP-WUS with small payload may be sent by a network to indicate to a group of UEs sharing the same multicast service. Therefore, power saving may be achieved, and signaling overhead may be reduced.

FIG. 1 illustrates an example communication environment 100 in which example embodiments of the present disclosure can be implemented. In the communication environment 100, a plurality of communication devices, comprising a first device 110 and a second device 120, can communicate with each other. In some example embodiments, the first device 110 may operate as a terminal device and the second device 120 may operate as a network device serving the terminal device.

In the following, for the purpose of illustration, some example embodiments are described with the first device 110 operating as a terminal device and the second device 120 operating as a network device. However, in some example embodiments, operations described with respect to a terminal device may be implemented at a network device or other devices, and operations described with respect to a network device may be implemented at a terminal device or other devices.

In some example embodiments, if the first device 110 is a terminal device and the second device 120 is a network device, a link from the second device 120 to the first device 110 is referred to as a DL, while a link from the first device 110 to the second device 120 is referred to as an uplink (UL). In DL, the second device 120 is a transmitting (TX) device (or a transmitter), and the first device 110 is a receiving (RX) device (or a receiver). In UL, the first device 110 is a TX device (or a transmitter), and the second device 120 is a RX device (or a receiver). If both the first device 110 and the second device 120 are terminal devices, a link between two terminal devices is referred to as a sidelink (SL). In SL, one of the first and second devices 110 and 120 is a TX device (or a transmitter), and the other of the first and second devices 110 and 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of devices and their connections shown in FIG. 1 are only for the purpose of illustration without suggesting any limitation. The communication environment 100 may include any suitable number of devices configured to implement example embodiments of the present disclosure. For example, in the scenario where the second apparatus 120 provides a multicast service (e.g., a MBS), there may be more devices which can receive the same multicast service.

In some example embodiments, the first device 110 is capable of monitoring for an LP-WUS and may include a first receiver and a second receiver. The first receiver may monitor for an LP-WUS and may be a low power receiver (such as a simple receiver with an envelope detector). The second receiver may monitor for other signals or channels and may be a main receiver. In some cases, the first receiver and the second receiver may share at least a part. For example, the first receiver may actually reuse many components of the second receiver BUT in a way optimized for low power. In some other cases, the first and second receives may be the same receiver. In this case, a receiver may be operated either in an active state for full reception processing, or in a very low power state with a limited reception capability for monitoring for the LP-WUS.

In some example embodiments, the second receiver may be in a sleep, deep-sleep or even OFF state and may be switched to an active or ON state. According to some example embodiments of the present disclosure, a wakeup signal is sent by the second apparatus 120 to indicate that a next transmission for a multicast service is a new initial transmission or a retransmission. After receiving this wakeup signal, the first apparatus 110 can determine the subsequent operations, for example, whether to wake the main radio up for the subsequent reception.

Some example implementations will be described in detail below with reference to FIGS. 2 and 3.

Figure 2:
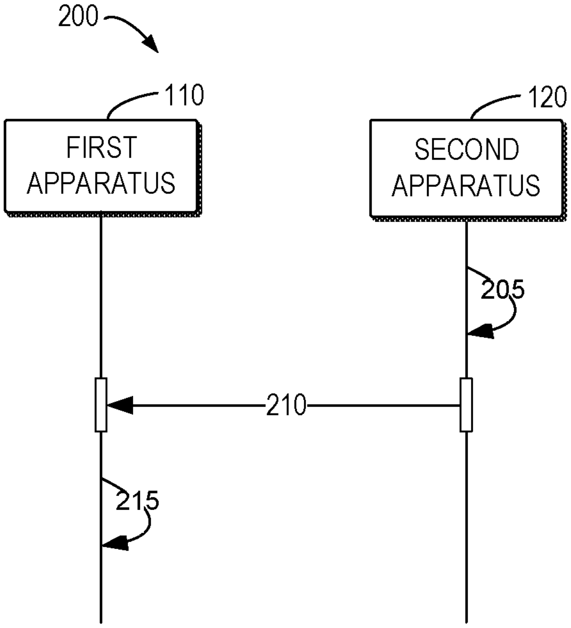
FIG. 2 illustrates a signaling diagram of a communication process between first and second apparatuses according to some example embodiments of the present disclosure.

FIG. 2 shows a signaling diagram of a communication process 200 between the first and second apparatuses 110 and 120 in accordance with some example embodiments of the present disclosure. For the purpose of discussion, the process 200 will be described with reference to FIG. 1.

As shown in FIG. 2, the second apparatus 120 determines (205) that a next transmission for a multicast service is a new initial transmission or a retransmission. In some example embodiments, the multicast service may comprise a multicast and broadcast service (MBS). Then, the second apparatus 120 transmits (210) a wakeup signal such as an LP-WUS indicating that the next transmission for a multicast service is the new initial transmission or the retransmission. The wakeup signal may be transmitted to a group of devices sharing this multicast service.

In some example embodiments, the second apparatus 120 may indicate that the wakeup signal is for the multicast service, using at least one of: time and/or frequency resources of the wakeup signal, a sequence of the wakeup signal, or an indication included in payload of the wakeup signal. Accordingly, after the first apparatus 110 receives (215) this wakeup signal, the first apparatus 110 may determine that the wakeup signal is for the multicast service, by detecting use of a specific time/frequency resource, use of a specific sequence, or an indication in the payload of the wakeup signal.

In some example embodiments, if the wakeup signal indicates that the next transmission is the retransmission, the second apparatus 120 may transmit DCI to schedule the retransmission after transmitting the wakeup signal. Alternatively, or in addition, if the wakeup signal indicates that the next transmission is the new initial transmission, the second apparatus 120 may transmit DCI to schedule the new initial transmission.

Accordingly, after the first apparatus 110 receives (215) this wakeup signal, the first apparatus 110 performs (220) an action. In some example embodiments, the wakeup signal may be received via the first receiver (e.g., a wakeup low power radio) while the second receiver (e.g., a main radio) is in a low power mode (for example, a sleep, deep-sleep or even OFF state).

In some example embodiments, if the wakeup signal received via the first receiver indicates that the next transmission is a new initial transmission, the first apparatus 110 may determine that next DCI schedules the new initial transmission. In some example embodiments, the first apparatus 110 may cause the second receiver (e.g., a main radio) to wake up, for example, to receive the DCI.

In some example embodiments, if the wakeup signal received via the first receiver indicates that the next transmission is the retransmission of a successfully received transmission, the first apparatus 110 may determine that next DCI schedules the retransmission. This means that the next transmission is unrelated to the first apparatus 110. In some example embodiments, the first apparatus 110 may cause the second receiver to remain in the low power mode for power saving.

In some example embodiments, the wakeup signal may further indicate a hybrid automatic repeat request (HARQ) process identification associated with the retransmission. This HARQ process identification (or an HARQ indicator) may allow the first apparatus 110 to determine whether the retransmission is needed by itself. The first apparatus 110 may cause the second receiver to wakeup if the retransmission is related to itself. As such, the power consumption may be further reduced.

Thus, retransmissions can be sent to a group of devices, even though for some of those devices within the group, a retransmission is not actually needed. Information (e.g., a new data indicator and possibly HARQ indicator) added to the LP-WUS enables the receiving devices that do not require retransmission, to determine whether the next DCI is for a retransmission that they need, thereby conserving power consumption by removing the need to wake up the main radio to decode the PDCCH DCI for a retransmission that is not needed.

In some example embodiments, the wakeup signal further may indicate that at least one further next transmission of the multicast service is a new initial transmission or a retransmission of the multicast service. For example, if the first apparatus 110 and the multicast service support the 2-transport-block capability with DCI format 4.2, then the LP-WUS could be used convey the new data indicator and possibly HARQ indicator for the 2 transport blocks using the same LP-WUS but with a larger payload. As such, signaling overhead may be further reduced.

In some example embodiments, presence of the wakeup signal may indicate that the next transmission is one of the new initial transmission and the retransmission, and absence of the wakeup signal may indicate that the next transmission is the other one of the new initial transmission and the retransmission. The use of the absence of a wakeup signal to indicate either the new initial transmission or the retransmission may further reduce the signaling overhead.

In some example embodiments, the use of the absence of a wakeup signal as an indication may depend on the transmission reliability of the wakeup signal and acceptable levels of a false alarm and misdetection for a given service. In an example, if the transmission reliability of the wakeup signal is higher, it means that a probability of missing of the wakeup signal is lower. In this case, the absence of a wakeup signal may be used to indicate one of the new initial transmission and the retransmission. In another example, if the acceptable levels of a false alarm and misdetection is higher for a multicast service, the absence of a wakeup signal may be used as an indication of either the new initial transmission or the retransmission.

In some example embodiments, the second apparatus 120 may transmit a configuration of the wakeup signal. The configuration may indicate when and/or where the wakeup signal is to be received. The configuration may further indicate that the wakeup signal is used to indicate whether a next transmission for a multicast service is a new initial transmission and a retransmission.

In some example embodiments, the configuration of the wakeup signal may be transmitted by the second apparatus 120 in at least one of a unicast, broadcast or multicast message. In some example embodiments, the second apparatus 120 may transmit a configuration of the wakeup signal in at least one of a radio resource control (RRC) message, a system information block (SIB) message, or a multicast control channel (MCCH).

For example, in the example embodiments where the second apparatus 120 operates as a network device, depending on the UE capability, the configuration of the wakeup signal may be UE specific or broadcast (e.g., via RRC, SIB or MCCH). The configuration may apply to INACTIVE or IDLE mode UEs (e.g., via broadcast or multicast) as well as CONNECTED mode UEs (e.g., via multicast). According, the first apparatus 110 may receive the configuration and use it for reception of the wakeup signal.

In some example embodiments, the wakeup signal may further indicate a transmission configuration for the next transmission. The transmission configuration may comprise configurations of PDSCH transmission characteristics (e.g., a specific MCS, time and frequency resource, and/or the like). Thus, the first apparatus 110 may receive the next transmission based on the transmission configuration indicated by the wakeup signal. In this way, after receiving the wakeup signal, rather than switching on the second receiver (e.g., the main radio) and READING DCIs, the first apparatus 110 may use the information carried by the wakeup signal to determine a physical downlink shared channel (PDSCH). This enables both the first apparatus 110 (e.g., UEs) and the second apparatus 120 (e.g., the network) to skip the legacy DCI transmission and read directly the PDSCH. Thereby, the power consumption may be further reduced, system overhead may be further reduced, and the communication efficiency may be further improved.

In some example embodiments, the wakeup signal may carry an index of a set of indexes to indicate a transmission configuration of a set of transmission configurations. For example, an index may predefine a transmission configuration, such as a specific MCS and time and frequency resource. After the first apparatus 110 receives the wakeup signal carrying the index of the set of indexes, the first apparatus 110 may determine the transmission configuration of the set of transmission configurations based on mapping information between the set of indexes and the set of transmission configurations.

In some example embodiments, the mapping information may be preconfigured. For example, the second apparatus 120 may transmit the mapping information in at least one of a RRC message or a SIB message. With the additional preconfiguration (e.g., via RRC or SIB) of indexed configurations of PDSCH transmission characteristics, the wakeup signal such as the LP-WUS could be used to by-pass the PDCCH DCI completely. Alternatively, the mapping information may be specified in the 3GPP standards.

Figure 3:
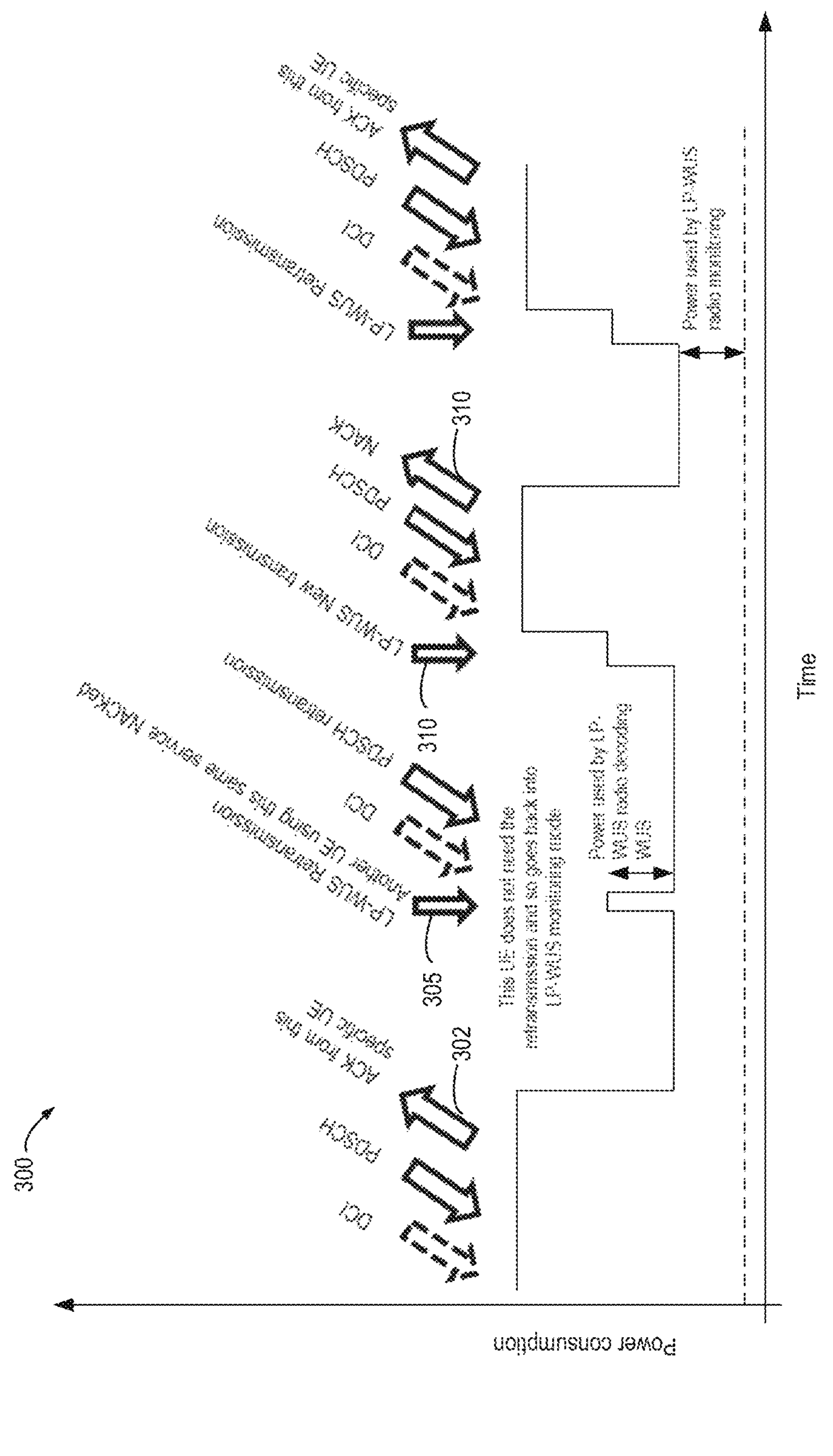
FIG. 3 illustrates a timing diagram of operations at a first apparatus according to some example embodiments of the present disclosure.

FIG. 3 shows a timing diagram 300 of operations at the first apparatus 110 in accordance with some example embodiments of the present disclosure. In this example, the first apparatus 110 operates as a UE, and an LP-WUS is an example implementation of the wakeup signal.

As shown in FIG. 3, after first apparatus 110 receives (305) an LP-WUS indicating a retransmission for another UE using the same service and NACKed the previous transmission, the first apparatus 110 determines that it does not need the retransmission and goes back into an LP-WUS monitoring mode. After the first apparatus 110 receives (310) an LP-WUS indicating a new transmission, the main radio wakes up for full DCI processing. The first apparatus 110 drops to the LP-WUS monitoring mode as soon as it transmits (302, 310) acknowledgements (ACKs) or non-acknowledgements (NACKs).

Example Methods

Figure 4:
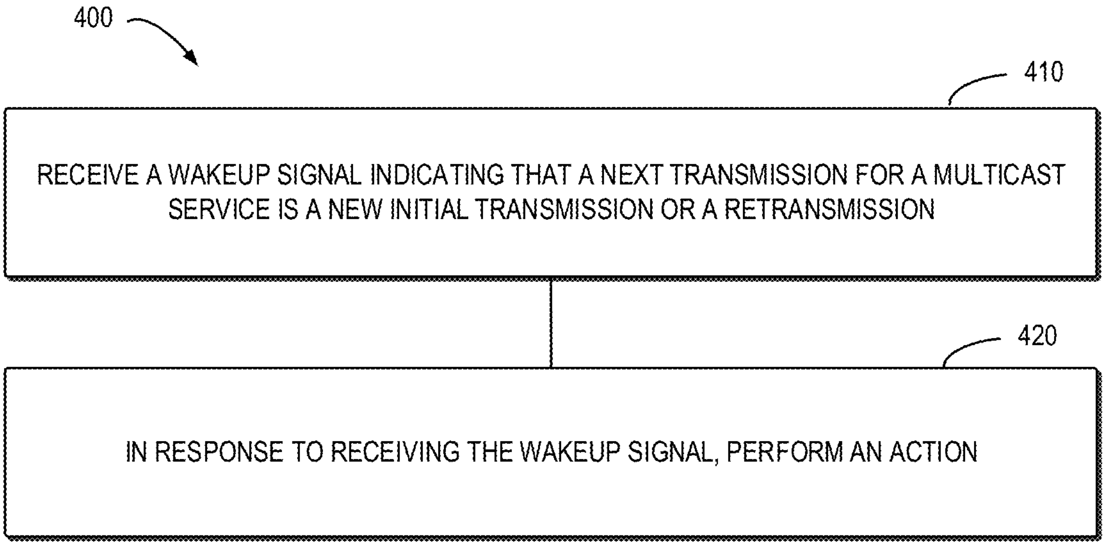
FIG. 4 illustrates a flowchart of a method of a transmission indication for a multicast service according to some example embodiments of the present disclosure.

FIG. 4 shows a flowchart of an example method 400 implemented at a first apparatus in accordance with some example embodiments of the present disclosure. The method 400 may be implemented at the first apparatus 110. For the purpose of discussion, the method 400 will be described from the perspective of the first apparatus 110 with reference to FIG. 1.

At block 410, the first apparatus 110 receives a wakeup signal indicating that a next transmission for a multicast service is a new initial transmission or a retransmission. At block 420, in response to receiving the wakeup signal, the first apparatus 110 performs an action.

In some example embodiments, the wakeup signal may be received via a first receiver while a second receiver may be in a low power mode.

In some example embodiments, the first receiver may comprise a low power receiver, and the second receiver may comprise a main receiver.

In some example embodiments, in response to receiving, via the first receiver, the wakeup signal indicating that the next transmission is the retransmission of a successfully received transmission, the first apparatus 110 may cause the second receiver to remain in the low power mode.

In some example embodiments, in response to receiving, via the first receiver, the wakeup signal indicating that the next transmission is the new initial transmission, the first apparatus 110 may cause the second receiver to wake up.

In some example embodiments, based on the wakeup signal indicating that the next transmission is the retransmission, the first apparatus 110 may determine that next downlink control information (DCI) schedules the retransmission.

In some example embodiments, based on the wakeup signal indicating that the next transmission is the new initial transmission, the first apparatus 110 may determine that next downlink control information (DCI) schedules the new initial transmission.

In some example embodiments, the wakeup signal may further indicate a transmission configuration for the next transmission.

In some example embodiments, the wakeup signal may carry an index of a set of indexes to indicate a transmission configuration of a set of transmission configurations.

In some example embodiments, in response to the wakeup signal carrying the index of the set of indexes, the first apparatus 110 may determine the transmission configuration of the set of transmission configurations based on mapping information between the set of indexes and the set of transmission configurations.

In some example embodiments, the first apparatus 110 may receive the mapping information in at least one of a radio resource control (RRC) message or a system information block (SIB) message.

In some example embodiments, the wakeup signal may indicate that the next transmission is the retransmission, and the wakeup signal further indicates a hybrid automatic repeat request (HARQ) process identification associated with the retransmission.

In some example embodiments, the wakeup signal further may indicate that at least one further next transmission of the multicast service is a new initial transmission or a retransmission of the multicast service.

In some example embodiments, presence of the wakeup signal may indicate that the next transmission is one of the new initial transmission and the retransmission, and absence of the wakeup signal may indicate that the next transmission is the other one of the new initial transmission and the retransmission.

In some example embodiments, the first apparatus 110 may receive a configuration of the wakeup signal in at least one of a unicast, broadcast or multicast message.

In some example embodiments, the first apparatus 110 may receive a configuration of the wakeup signal in at least one of a radio resource control (RRC) message, a system information block (SIB) message, or a multicast control channel (MCCH).

In some example embodiments, the first apparatus 110 may determine that the wakeup signal is for the multicast service, based on at least one of: time and/or frequency resources of the wakeup signal, a sequence of the wakeup signal, or an indication included in payload of the wakeup signal.

In some example embodiments, the wakeup signal may comprise a low power wake up signal (LP-WUS).

In some example embodiments, the multicast service may comprise a multicast and broadcast service (MBS).

Figure 5:
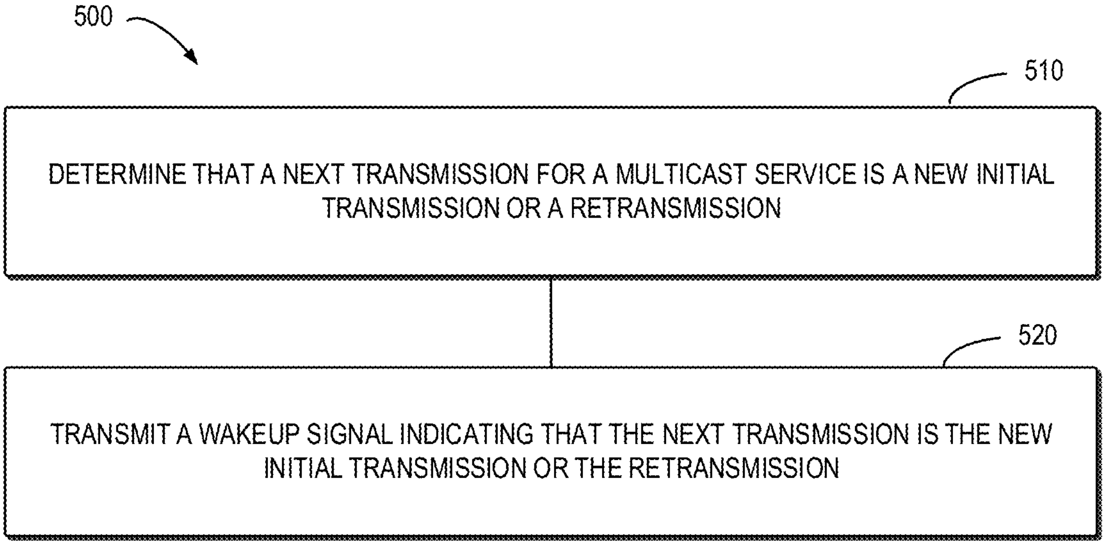
FIG. 5 illustrates a flowchart of another method of a transmission indication for a multicast service according to some example embodiments of the present disclosure.

FIG. 5 shows a flowchart of an example method 500 implemented at a second apparatus in accordance with some example embodiments of the present disclosure. The method 500 may be implemented at the second apparatus 120. For the purpose of discussion, the method 500 will be described from the perspective of the second apparatus 120 with reference to FIG. 1.

At block 510, the second apparatus 120 determines that a next transmission for a multicast service is a new initial transmission or a retransmission. At block 520, the second apparatus 120 transmits a wakeup signal indicating that the next transmission is the new initial transmission or the retransmission.

In some example embodiments, after transmitting the wakeup signal indicating that the next transmission is the retransmission, the second apparatus 120 may transmit downlink control information (DCI) to schedule the retransmission.

In some example embodiments, after transmitting the wakeup signal indicating that the next transmission is the new initial transmission, the second apparatus 120 may transmit downlink control information (DCI) to schedule the new initial transmission.

In some example embodiments, the wakeup signal may further indicate a transmission configuration for the next transmission.

In some example embodiments, the wakeup signal may carry an index of a set of indexes to indicate a transmission configuration of a set of transmission configurations based on mapping information between the set of indexes and the set of transmission configurations.

In some example embodiments, the second apparatus 120 may transmit the mapping information in at least one of a radio resource control (RRC) message or a system information block (SIB) message.

In some example embodiments, the wakeup signal may indicate that the next transmission is the retransmission, and the wakeup signal further indicates a hybrid automatic repeat request (HARQ) process identification associated with the retransmission.

In some example embodiments, the wakeup signal may further indicate that at least one further next transmission of the multicast service is a new initial transmission or a retransmission of the multicast service.

In some example embodiments, presence of the wakeup signal may indicate that the next transmission is one of the new initial transmission and the retransmission, and absence of the wakeup signal may indicate that the next transmission is the other one of the new initial transmission and the retransmission.

In some example embodiments, the second apparatus 120 may transmit a configuration of the wakeup signal in at least one of a unicast, broadcast or multicast message.

In some example embodiments, the second apparatus 120 may transmit a configuration of the wakeup signal in at least one of a radio resource control (RRC) message, a system information block (SIB) message, or a multicast control channel (MCCH).

In some example embodiments, the second apparatus 120 may indicate that the wakeup signal is for the multicast service, using at least one of: time and/or frequency resources of the wakeup signal, a sequence of the wakeup signal, or an indication included in payload of the wakeup signal.

In some example embodiments, the wakeup signal may comprise a low power wake up signal (LP-WUS).

In some example embodiments, the multicast service may comprise a multicast and broadcast service (MBS).

All operations and features related to the first apparatus 110 and the second apparatus 120 as described above with reference to FIGS. 1 to 3 are likewise applicable to the methods 400 and 500 and have similar effects. For the purpose of simplification, the details will be omitted.

Example Apparatus, Device and Medium

In some example embodiments, a first apparatus capable of performing the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises means for receiving a wakeup signal indicating that a next transmission for a multicast service is a new initial transmission or a retransmission; and means for in response to receiving the wakeup signal, performing an action.

In some example embodiments, the wakeup signal is received via a first receiver while a second receiver is in a low power mode.

In some example embodiments, the first receiver comprises a low power receiver, and the second receiver comprises a main receiver.

In some example embodiments, the means for performing comprises means for in response to receiving, via the first receiver, the wakeup signal indicating that the next transmission is the retransmission of a successfully received transmission, causing the second receiver to remain in the low power mode.

In some example embodiments, the means for performing comprises means for in response to receiving, via the first receiver, the wakeup signal indicating that the next transmission is the new initial transmission, causing the second receiver to wake up.

In some example embodiments, the means for performing comprises means for based on the wakeup signal indicating that the next transmission is the retransmission, determining that next downlink control information (DCI) schedules the retransmission.

In some example embodiments, the means for performing comprises means for based on the wakeup signal indicating that the next transmission is the new initial transmission, determining that next downlink control information (DCI) schedules the new initial transmission.

In some example embodiments, the wakeup signal further indicates a transmission configuration for the next transmission.

In some example embodiments, the wakeup signal carries an index of a set of indexes to indicate a transmission configuration of a set of transmission configurations.

In some example embodiments, the first apparatus further comprises: means for in response to the wakeup signal carrying the index of the set of indexes, determining the transmission configuration of the set of transmission configurations based on mapping information between the set of indexes and the set of transmission configurations.

In some example embodiments, the first apparatus further comprises: means for receiving the mapping information in at least one of a radio resource control (RRC) message or a system information block (SIB) message.

In some example embodiments, the wakeup signal indicates that the next transmission is the retransmission, and the wakeup signal further indicates a hybrid automatic repeat request (HARQ) process identification associated with the retransmission.

In some example embodiments, the wakeup signal further indicates that at least one further next transmission of the multicast service is a new initial transmission or a retransmission of the multicast service.

In some example embodiments, presence of the wakeup signal indicates that the next transmission is one of the new initial transmission and the retransmission, and absence of the wakeup signal indicates that the next transmission is the other one of the new initial transmission and the retransmission.

In some example embodiments, the first apparatus further comprises: means for receiving a configuration of the wakeup signal in at least one of a unicast, broadcast or multicast message.

In some example embodiments, the first apparatus further comprises: means for receiving a configuration of the wakeup signal in at least one of a radio resource control (RRC) message, a system information block (SIB) message, or a multicast control channel (MCCH).

In some example embodiments, the first apparatus further comprises: means for determining that the wakeup signal is for the multicast service, based on at least one of: time and/or frequency resources of the wakeup signal, a sequence of the wakeup signal, or an indication included in payload of the wakeup signal.

In some example embodiments, the wakeup signal comprises a low power wake up signal (LP-WUS).

In some example embodiments, the multicast service comprises a multicast and broadcast service (MBS).

In some example embodiments, the first apparatus further comprises means for performing other operations in some example embodiments of the method 400 or the first apparatus 110. In some example embodiments, the means comprises at least one processor; and at least one memory storing instructions that, when executed by the at least one processor, cause the performance of the first apparatus.

In some example embodiments, a second apparatus capable of performing the method 500 (for example, the second apparatus 120 in FIG. 1) may comprise means for performing the respective operations of the method 500. The means may be implemented in any suitable form. For example, the means may be implemented in a circuitry or software module. The second apparatus may be implemented as or included in the second apparatus 120 in FIG. 1.

In some example embodiments, the second apparatus comprises means for determining that a next transmission for a multicast service is a new initial transmission or a retransmission; and means for transmitting a wakeup signal indicating that the next transmission is the new initial transmission or the retransmission.

In some example embodiments, the second apparatus further comprises: means for after transmitting the wakeup signal indicating that the next transmission is the retransmission, transmitting downlink control information (DCI) to schedule the retransmission.

In some example embodiments, the second apparatus further comprises: means for after transmitting the wakeup signal indicating that the next transmission is the new initial transmission, transmitting downlink control information (DCI) to schedule the new initial transmission.

In some example embodiments, the wakeup signal further indicates a transmission configuration for the next transmission.

In some example embodiments, the wakeup signal carries an index of a set of indexes to indicate a transmission configuration of a set of transmission configurations based on mapping information between the set of indexes and the set of transmission configurations.

In some example embodiments, the second apparatus further comprises: means for transmitting the mapping information in at least one of a radio resource control (RRC) message or a system information block (SIB) message.

In some example embodiments, the wakeup signal indicates that the next transmission is the retransmission, and the wakeup signal further indicates a hybrid automatic repeat request (HARQ) process identification associated with the retransmission.

In some example embodiments, the wakeup signal further indicates that at least one further next transmission of the multicast service is a new initial transmission or a retransmission of the multicast service.

In some example embodiments, presence of the wakeup signal indicates that the next transmission is one of the new initial transmission and the retransmission, and absence of the wakeup signal indicates that the next transmission is the other one of the new initial transmission and the retransmission.

In some example embodiments, the second apparatus further comprises: means for transmitting a configuration of the wakeup signal in at least one of a unicast, broadcast or multicast message.

In some example embodiments, the second apparatus further comprises: means for transmitting a configuration of the wakeup signal in at least one of a radio resource control (RRC) message, a system information block (SIB) message, or a multicast control channel (MCCH).

In some example embodiments, the second apparatus further comprises: means for indicating that the wakeup signal is for the multicast service, using at least one of: time and/or frequency resources of the wakeup signal, a sequence of the wakeup signal, or an indication included in payload of the wakeup signal.

In some example embodiments, the wakeup signal comprises a low power wake up signal (LP-WUS).

In some example embodiments, the multicast service comprises a multicast and broadcast service (MBS).

In some example embodiments, the second apparatus further comprises means for performing other operations in some example embodiments of the method 400 or the second apparatus 120. In some example embodiments, the means comprises at least one processor; and at least one memory storing instructions that, when executed by the at least one processor, cause the performance of the second apparatus.

Figure 6:
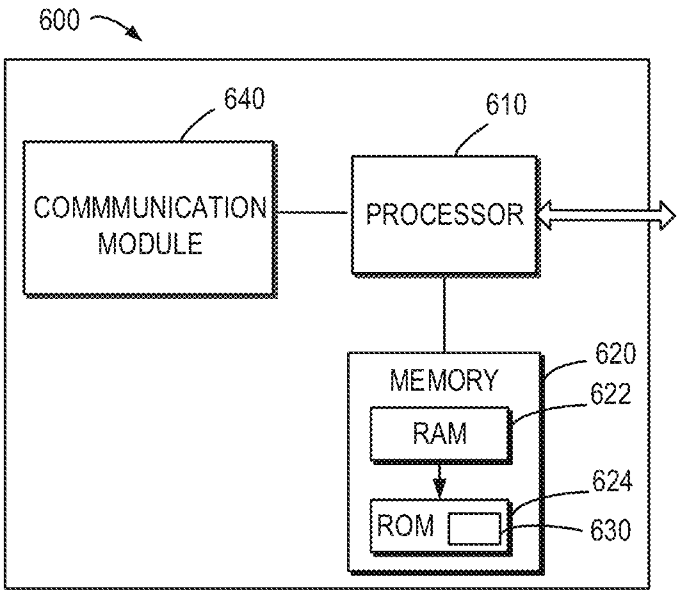
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110 or the second apparatus 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 1 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
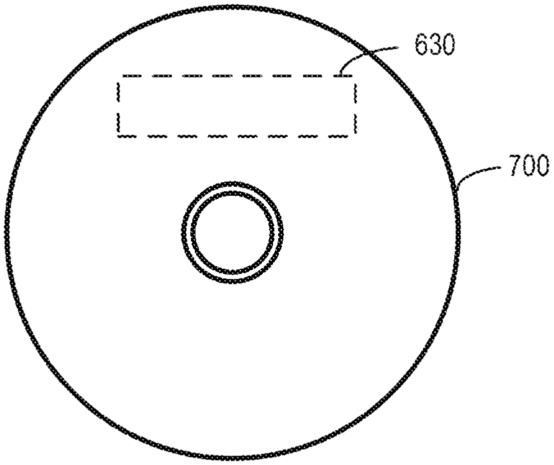
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

receive a first wakeup signal indicating that a next transmission for a multicast service is a retransmission, wherein:

the first wakeup signal is received via a first receiver while a second receiver is in a low power mode, the first receiver is a low power receiver and the second receiver is a main receiver, the first wakeup signal indicates a transmission configuration for a next transmission, the first wakeup signal carries an index of a set of indexes to indicate a transmission configuration of a set of transmission configurations;

determine that the first wakeup signal is for the multicast service, based on the following:

time and frequency resources of the first wakeup signal, a sequence of the first wakeup signal, and an indication included in payload of the first wakeup signal; and in response to the first wakeup signal carrying the index of the set of indexes, determining the transmission configuration of the set of transmission configurations based on mapping information between the set of indexes and the set of transmission configurations, wherein the transmission configuration of the first wakeup signal is received in a radio resource control (RRC) message, a system information block (SIB) message, and a multicast control channel (MCCH), in response to receiving, by the first receiver, the first wakeup signal indicating that the next transmission is the retransmission of a successfully received transmission, cause the second receiver to remain in the low power mode;

receive a second wakeup signal indicating that a next transmission for a multicast service is a new initial transmission, wherein the second wakeup signal is received via the first receiver while the second receiver is in the low power mode, wherein the transmission configuration indicates when and where the second wakeup signal is to be received, and wherein the transmission configuration may further indicate that the second wakeup signal is used to indicate that the next transmission for the multicast service is the new initial transmission; and in response to receiving, via the first receiver, the second wakeup signal indicating that the next transmission is the new initial transmission, cause the second receiver to wake up.

2. The first apparatus of claim 1, wherein at least one memory and the at least one processor further cause the first apparatus to:

based on the first wakeup signal indicating that the next transmission is the retransmission, determine that next downlink control information (DCI) schedules the retransmission.

3. The first apparatus of claim 1, wherein at least one memory and the at least one processor further cause the first apparatus to:

based on the second wakeup signal indicating that the next transmission is the new initial transmission, determine that next downlink control information (DCI) schedules the new initial transmission.

4. The first apparatus of claim 3, wherein the first wakeup signal further indicates a hybrid automatic repeat request (HARQ) process identification associated with the retransmission.

5. The first apparatus of claim 4, wherein the first wakeup signal further indicates that at least one further next transmission of the multicast service is a new initial transmission or a retransmission of the multicast service.

6. The first apparatus of claim 5, wherein absence of the second wakeup signal indicates that the next transmission is the other one of the new initial transmission and the retransmission.

7. The first apparatus of any claim 6, wherein the first wakeup signal comprises a low power wake up signal (LP-WUS).

8. The first apparatus of any of claim 7, wherein the multicast service comprises a multicast and broadcast service (MBS).

9. A system comprising:

a first apparatus comprising:

at least one processor; and at least one memory storing instructions that, when executed by the at least one processor, cause the first apparatus at least to:

receive a first wakeup signal indicating that a next transmission for a multicast service is a retransmission, wherein:

the first wakeup signal is received via a first receiver while a second receiver is in a low power mode, the first receiver is a low power receiver and the second receiver is a main receiver, the first wakeup signal indicates a transmission configuration for a next transmission, the first wakeup signal carries an index of a set of indexes to indicate a transmission configuration of a set of transmission configurations;

determine that the first wakeup signal is for the multicast service, based on the following:

time and frequency resources of the first wakeup signal, a sequence of the first wakeup signal, and an indication included in payload of the first wakeup signal; and in response to the first wakeup signal carrying the index of the set of indexes, determining the transmission configuration of the set of transmission configurations based on mapping information between the set of indexes and the set of transmission configurations, wherein the transmission configuration of the first wakeup signal is received in a radio resource control (RRC) message, a system information block (SIB) message, and a multicast control channel (MCCH), in response to receiving, by the first receiver, the first wakeup signal indicating that the next transmission is the retransmission of a successfully received transmission, cause the second receiver to remain in the low power mode;

receive a second wakeup signal indicating that a next transmission for a multicast service is a new initial transmission, wherein the second wakeup signal is received via the first receiver while the second receiver is in the low power mode, wherein the transmission configuration indicates when and where the second wakeup signal is to be received, and wherein the transmission configuration may further indicate that the second wakeup signal is used to indicate that the next transmission for the multicast service is the new initial transmission; and in response to receiving, via the first receiver, the second wakeup signal indicating that the next transmission is the new initial transmission, cause the second receiver to wake up.

10. The system of claim 9, wherein at least one memory and the at least one processor further cause the first apparatus to:

based on the first wakeup signal indicating that the next transmission is the retransmission, determine that next downlink control information (DCI) schedules the retransmission.

11. The system of claim 10, wherein at least one memory and the at least one processor further cause the first apparatus to:

based on the second wakeup signal indicating that the next transmission is the new initial transmission, determine that next downlink control information (DCI) schedules the new initial transmission.

12. The system of claim 11, wherein the first wakeup signal further indicates a hybrid automatic repeat request (HARQ) process identification associated with the retransmission.

13. The system of claim 12, wherein the first wakeup signal further indicates that at least one further next transmission of the multicast service is a new initial transmission or a retransmission of the multicast service.

14. The system of claim 13, wherein absence of the first wakeup signal indicates that the next transmission is the other one of the new initial transmission and the retransmission.

15. The system of any claim 14, wherein the first wakeup signal comprises a low power wake up signal (LP-WUS).

16. A method comprising:

receiving a first wakeup signal indicating that a next transmission for a multicast service is a retransmission, wherein:

the first wakeup signal is received via a first receiver while a second receiver is in a low power mode, the first receiver is a low power receiver and the second receiver is a main receiver, the first wakeup signal indicates a transmission configuration for a next transmission, the first wakeup signal carries an index of a set of indexes to indicate a transmission configuration of a set of transmission configurations;

determining that the first wakeup signal is for the multicast service, based on the following:

time and frequency resources of the first wakeup signal, a sequence of the first wakeup signal, and an indication included in payload of the first wakeup signal; and in response to the first wakeup signal carrying the index of the set of indexes, determining the transmission configuration of the set of transmission configurations based on mapping information between the set of indexes and the set of transmission configurations, wherein the transmission configuration of the first wakeup signal is received in a radio resource control (RRC) message, a system information block (SIB) message, and a multicast control channel (MCCH), in response to receiving, by the first receiver, the first wakeup signal indicating that the next transmission is the retransmission of a successfully received transmission, causing the second receiver to remain in the low power mode;

receiving a second wakeup signal indicating that a next transmission for a multicast service is a new initial transmission, wherein the second wakeup signal is received via the first receiver while the second receiver is in the low power mode, wherein the transmission configuration indicates when and where the second wakeup signal is to be received, and wherein the transmission configuration may further indicate that the second wakeup signal is used to indicate that the next transmission for the multicast service is the new initial transmission; and in response to receiving, via the first receiver, the second wakeup signal indicating that the next transmission is the new initial transmission, causing the second receiver to wake up.

17. The method of claim 16, further comprising: based on the first wakeup signal indicating that the next transmission is the retransmission, determine that next downlink control information (DCI) schedules the retransmission.

18. The method of claim 17, further comprising: based on the second wakeup signal indicating that the next transmission is the new initial transmission, determine that next downlink control information (DCI) schedules the new initial transmission.

19. The method of claim 18, wherein the first wakeup signal further indicates a hybrid automatic repeat request (HARQ) process identification associated with the retransmission.

20. The method of claim 19, wherein the first wakeup signal further indicates that at least one further next transmission of the multicast service is a new initial transmission or a retransmission of the multicast service.

* * * * *